United States Patent
Li (10) Patent No.: US 9,471,268 B2
(45) Date of Patent: Oct. 18, 2016

(54) MULTI-CHANNEL KVM SERVER SYSTEM EMPLOYING MULTIRESOLUTION DECOMPOSITION

(75) Inventor: Wenshun Li, Richmond (CA)

(73) Assignee: ATEN INTERNATIONAL CO., LTD., Shijr (TW)

(*) Notice: Subject to any disclaimer, the term of this patent is extended or adjusted under 35 U.S.C. 154(b) by 1489 days.

(21) Appl. No.: 12/469,580

(22) Filed: May 20, 2009

(65) Prior Publication Data

US 2010/0295999 A1 Nov. 25, 2010

(51) Int. Cl.
| | |
|---|---|
| *G06F 3/14* | (2006.01) |
| *H04N 21/2343* | (2011.01) |
| *H04N 21/24* | (2011.01) |
| *H04N 19/63* | (2014.01) |
| *G09G 5/36* | (2006.01) |

(52) U.S. Cl.
CPC ............ *G06F 3/1446* (2013.01); *H04N 19/63* (2014.11); *H04N 21/234327* (2013.01); *H04N 21/234363* (2013.01); *H04N 21/2402* (2013.01); *G09G 5/363* (2013.01); *G09G 2340/12* (2013.01); *G09G 2360/06* (2013.01); *G09G 2370/24* (2013.01)

(58) Field of Classification Search
None
See application file for complete search history.

(56) References Cited

U.S. PATENT DOCUMENTS

| | | | |
|---|---|---|---|
| 5,103,306 A * | 4/1992 | Weiman et al. ............ 348/400.1 |
| 5,870,502 A | 2/1999 | Bonneau et al. |
| 5,900,916 A | 5/1999 | Pauley |
| 6,134,350 A | 10/2000 | Beck |
| 6,373,500 B1 | 4/2002 | Daniels |
| 6,553,141 B1 | 4/2003 | Huffman |
| 6,711,297 B1 * | 3/2004 | Chang et al. ................ 382/240 |
| 7,024,045 B2 | 4/2006 | McIntyre |
| 7,240,111 B2 | 7/2007 | VanHarlingen et al. |
| 7,308,515 B2 | 12/2007 | Yang |
| 7,330,919 B2 | 2/2008 | Zhang et al. |
| 7,889,791 B2 * | 2/2011 | Taubman ................ 375/240.11 |
| 2002/0116539 A1 | 8/2002 | Bryczkowski et al. |
| 2003/0112248 A1 | 6/2003 | Pronkine |
| 2003/0218578 A1 * | 11/2003 | Ahern et al. .................. 345/2.1 |
| 2004/0015980 A1 | 1/2004 | Rowen et al. |
| 2005/0275641 A1 | 12/2005 | Franz |
| 2006/0176293 A1 | 8/2006 | Hoshino |
| 2007/0200858 A1 * | 8/2007 | Hsieh et al. .................. 345/505 |
| 2007/0237402 A1 | 10/2007 | Dekel et al. |
| 2007/0257883 A1 * | 11/2007 | Ke ................................ 345/157 |

(Continued)

OTHER PUBLICATIONS

A. Grossmann and J. Morlet, "Decomposition of Hardy function into square integrable wavelets of constant shape," SIAM J. Math. Anal., vol. 15, pp. 723-736, 1984 (Abstract).

(Continued)

*Primary Examiner* — Christopher S Kelley
(74) *Attorney, Agent, or Firm* — Chen Yoshimura LLP (57) ABSTRACT

A multi-channel KVM server system for supplying video data to a plurality of clients is disclosed. The KVM server includes a plurality of video processors and a video switch for connecting each video processor to one or more video sources. Each video processor processes video data using a multiresolution decomposition method to generate a plurality of decomposition components at different resolution levels. A main processor of the KVM server transmits the decomposition components generated by various video processors to various clients based on the clients' requirements. When some clients are in a multi-source ("TV wall") mode and some clients are in a single-source mode, the main processor uses decomposition components generated by some video processors to supply both the clients in single-source mode and as a part of the TV wall data for the clients in multi-source mode.

18 Claims, 7 Drawing Sheets

(56) References Cited

U.S. PATENT DOCUMENTS

| | | | |
|---|---|---|---|
| 2008/0048975 A1 | 2/2008 | Leibow | |
| 2008/0058608 A1 | 3/2008 | Garibaldi et al. | |
| 2008/0058609 A1 | 3/2008 | Garibaldi et al. | |
| 2008/0058963 A1 | 3/2008 | Garibaldi et al. | |
| 2008/0059598 A1 | 3/2008 | Garibaldi et al. | |
| 2008/0064933 A1 | 3/2008 | Garibaldi et al. | |
| 2008/0091858 A1* | 4/2008 | Zhang et al. | 710/72 |
| 2008/0240229 A1* | 10/2008 | Powell | 375/240.01 |
| 2010/0161825 A1* | 6/2010 | Ronca et al. | 709/231 |

OTHER PUBLICATIONS

I. Daubechies, "Orthonormal bases of compactly supported wavelets," Commun. Pure Appl. Math., vol. 41, pp. 909-996, 1988 (Abstract).

S. Mallat, "A theory for multiresolution signal decomposition: The wavelet representation," IEEE Trans. Patt Anal. Machine Intell., vol. 7, pp. 674-693, 1989.

G. T. Strang, "Wavelets and dilation equations: A brief introduction," SIAM Rev., vol. 31, pp. 614-627, 1989.

M. Antonini, M. Barlaud, P. Mathieu, and I. Daubechies, "Image coding using wavelet transform," IEEE Trans. Image Processing, vol. 1, No. 2, pp. 205-220, 1992.

M. G. Albanesi and I. Delotto, "Image compression by the wavelet decomposition," Signal Processing, vol. 3, No. 3, pp. 265-274, 1992 (Abstract).

Wenshun Li and Jiegu Li, "Image Compression Using Multiresolution Decomposition of Triangular Mesh Model," Acta Automatica Sinica, 1999 25 (05): 613-619 (English abstract).

Rose Electronics, Quadra Vista, Product information of "Quad Video Controller," Houston, Texas, 2 pages, 2005.

* cited by examiner

MULTI-CHANNEL KVM SERVER SYSTEM EMPLOYING MULTIRESOLUTION DECOMPOSITION

BACKGROUND OF THE INVENTION

1. Field of the Invention

This invention relates to image and video signal transmission, and in particular, it relates to a method of transmitting image and video signals with adjustable resolution and supporting a TV wall mode using multiresolution decomposition technique.

2. Description of the Related Art

Discrete wavelet transform is a technique often used in image analysis. The principle of discrete wavelet transform, as elaborated by a number of papers, is to hierarchically decompose an input signal into a series of lower resolution smooth signal and their associated detail signals. The decomposition is repeated for a number of levels; at each level, the smooth signal is decomposed into a smooth signal (contains most of the energy in the image at that level) and a number of detail signals at the next level (which generally contain relatively little energy). At each level, the smooth signal and the number of detail signals collectively contain the information needed to completely reconstruct the smooth signal at the next higher resolution level. See, for example, A. Grossmann and J. Morlet, "Decomposition of Hardy function into square integrable wavelets of constant shape," SIAM J. Math. Anal., Vol. 15, pp. 723~736, 1984; I. Daubechies, "Orthonormal bases of compactly supported wavelets," Commun. Pure Appl. Math., Vol. 41, pp. 909~996, 1988; S. Mallat, "A theory for multiresolution signal decomposition: The wavelet representation," IEEE Trans. Patt Anal. Machine Intell., Vol. 7, pp. 674~693, 1989; and G. T. STRANG, "Wavelets and dilation equations: A brief introduction," SIAM Rev., Vol. 31, pp. 614~627, 1989. This technique is also referred to as multiresolution decomposition. There are many different implementations of multiresolution decomposition by using different types of wavelet filter banks, such as 9/7 tap filter bank, D4 filter bank, Haar filter bank, triangular-mesh based image filter bank, etc. The type of filter bank is determined by the scalar function and the wavelet function that are used. See, for example, M. Antonini, M. Barlaud, P. Mathieu, and I. Daubechies, "Image coding using wavelet transform," IEEE Trans. Image Processing, Vol. 1, no. 2, 1992; I. Daubechies, "Orthonormal bases of compactly supported wavelets," Commun. Pure Appl. Math., Vol. 41, pp. 909~996, 1988; M. G. Albanesi and I. Delotto, "Image compression by the wavelet decomposition," Signal Processing, Vol. 3, no. 3, pp. 265~274, 1992; and Wenshun Li and Jiegu Li, "Image Compression Using Multiresolution Decomposition of Triangular Mesh Model," Acta Automatica Sinica, 1999 25 (05): 613-619.

Figure 1:
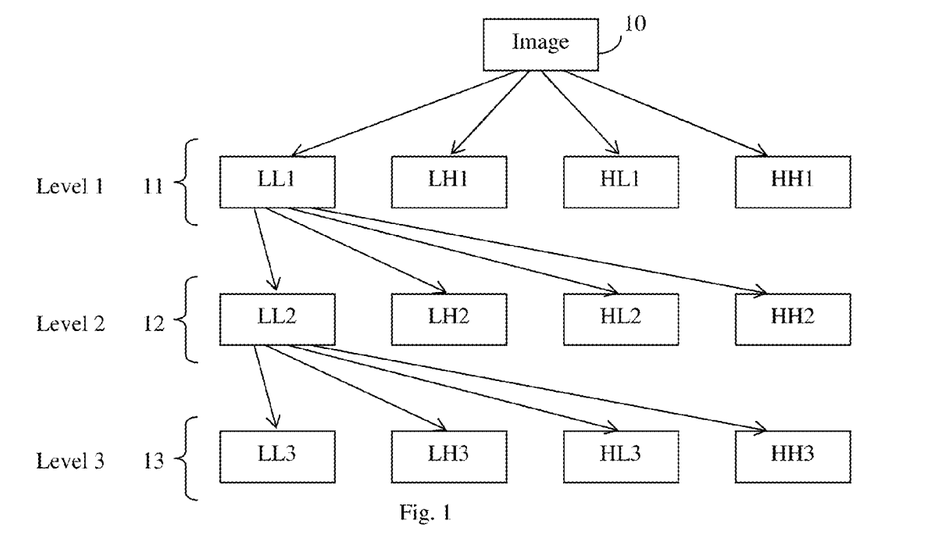
FIG. 1 schematically illustrates an example of how an image is decomposed into lower resolution signals by a three-level multiresolution decomposition.
Figure 2:
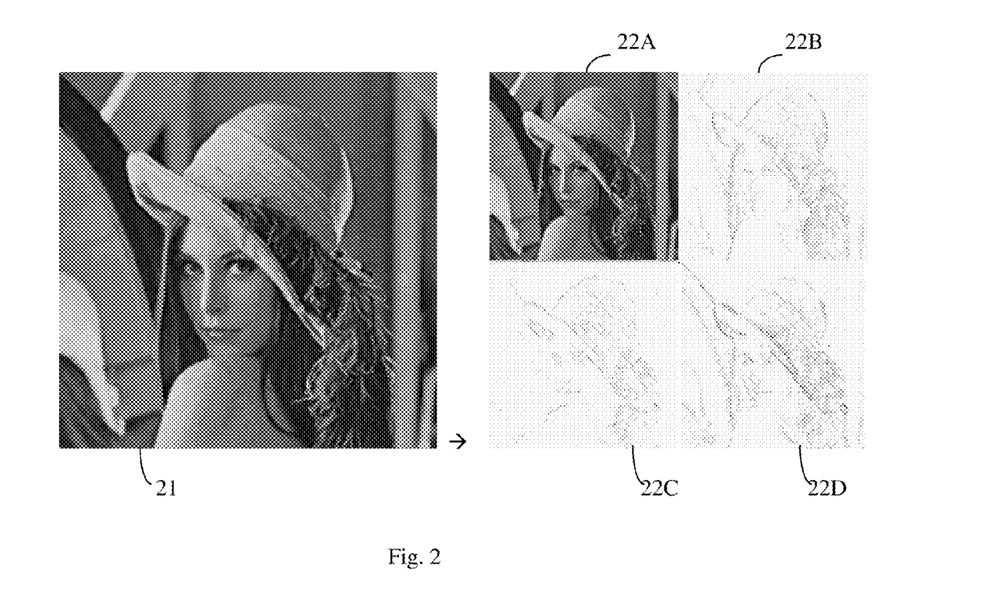
FIG. 2 illustrates a two-dimensional image signal and four lower resolution level signals resulting from one level of decomposition.

FIG. 1 schematically illustrates an example of how an image is decomposed into lower resolution signals by a three-level multiresolution decomposition. The original image 10 is decomposed into four first resolution level signals 11, indicated here as LL1, LH1, HL1 and HH1, by applying low-pass and high-pass filters to the original image. LL1 is the first-level smooth signal, while LH1, HL1 and HH1 are first-level detail signals. The smooth signal LL1 is generated by applying a low-pass filter to the original image in both the horizontal and vertical directions; the detail signal LH1 is generated by applying a low-pass filter in the horizontal direction and a high-pass filter in the vertical direction; the detail signal HL1 is generated by applying high-pass filter in the horizontal direction and a low pass-filter in the vertical direction; and the detail signal HH1 is generated by applying a high-pass filter in both the horizontal and vertical directions. The first-level smooth signal LL1 has a lower spatial resolution, i.e., having fewer pixels, than the original image. The original image 10 can be completely reconstructed from the four first-level signals LL1, LH1, HL1 and HH1. The first-level smooth signal LL1 is in turn decomposed into four second resolution level signals 12, indicated here as smooth signal LL2 and detail signals LH2, HL2 and HH2. The first-level smooth signal LL1 can be completely reconstructed from the four second-level signals LL2, LH2, HL2 and HH2. The second-level smooth signal LL2 is further decomposed into four third resolution level signals 13. More levels of decomposition can be similarly carried out. FIG. 2 illustrates a two-dimensional image signal 21 and the four lower resolution level signals 22A-D resulting from one level of decomposition, including one smooth signal 22A, one horizontal signal 22B, one vertical signal 22C, and one diagonal direction signal 22D. It should be noted that in this example, the three detailed signals 22B-D are in fact negative or inverted images (i.e., black background with white images), but for purposes of illustration, they are shown in FIG. 2 as positive images.

When the multiresolution decomposition process is finished, the resulting signals include one smooth signal of the lowest resolution level (i.e. the nth-level), and the detail signals of all resolution levels. In this respect, note that while FIG. 1 shows the higher resolution level smooth signals LL1 and LL2, they are in fact not present in the final resulting signals of the multiresolution decomposition. When reconstructing the original image, the lowest resolution level smooth signal (e.g. LL3 in this example) and the lowest resolution level detail signals (LH3, HL3 and HH3 in this example) are first used to construct the next higher resolution level smooth signal (LL2 in this example). The reconstructed smooth signal of that level (LL2) and the detail signals of the same level (LH2, HL2 and HH2 in this example) are used to reconstruct the smooth signal of one level above (LL1 in this example), and so on, until the original image is reconstructed.

SUMMARY OF THE INVENTION

The present invention is directed to a method and related apparatus for transmitting image and video signals with adjustable color quality and image quality.

An object of the present invention is to provide such an image or video signal transmitting method that eliminates the need to separately generate multiple image data each having a particular color quality or image quality for transmission to different clients.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a server for supplying video signals from a plurality of video sources to a plurality of clients, which includes: a plurality of video processing circuits; a video switch coupled to the plurality of video sources and the plurality of video processing circuits, the video switch being operable to connect each video processing circuit to one or more video sources; wherein each video processing circuit is operable to process video signals from the connected video sources using a multiresolution decomposition method to generate a plurality of decomposition components for each connected video source, including a smooth signal component and one or more detail signal components at one or more resolution levels, and a transmission circuit for selectively transmitting decomposition components generated by the video processing circuits to the clients based on requirements of the clients, wherein at least some of the time, the transmission circuit transmits decomposition components generated by two or more video processing circuits connected to two or more video sources to a single one of the clients.

In another aspect, the present invention provides, in a server system comprising a server, a plurality of video sources connected to the server, and a plurality of clients connected to the server, the server comprising a plurality of video processing circuits, a video switch connected to the plurality of video sources and the plurality of video processing circuits, and a transmission circuit coupled to the plurality of clients, a method executed by the server for supplying video signals from the plurality of video sources to the plurality of clients, which includes: (a) the video switch connecting each of at least some of the video processing circuits to one or more video sources; (b) each of the at least some of the video processing circuits processing video signals from the connected video sources using a multiresolution decomposition method to generate a plurality of decomposition components for each connected video source, including a smooth signal component and one or more detail signal components at one or more resolution levels; and (c) the transmission circuit transmitting at least some decomposition components generated by at least some video processing circuits to at least some clients based on requirements of the clients, wherein at least some of the time, the transmission circuit transmits decomposition components generated by two or more video processing circuits connected to two or more video sources to a single one of the clients.

In yet another aspect, the present invention provides a method for transmitting image signals by a server to a plurality of clients, which includes: (a) processing video signals from a plurality of video sources by a plurality of video processing circuits using multiresolution decomposition to generate a plurality of decomposition components, including, for the video signal from each video source, a smooth signal component and one or more detail signal components at one or more resolution levels; (b) determining a transmission requirement for each client, including a resolution and a mode indicating a number of video sources; and (c) transmitting to each client a plurality of the decomposition components based on the transmission requirement.

It is to be understood that both the foregoing general description and the following detailed description are exemplary and explanatory and are intended to provide further explanation of the invention as claimed.

DETAILED DESCRIPTION OF THE PREFERRED EMBODIMENTS

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. The following presents a detailed description of the preferred embodiment (as well as some alternative embodiments) of the present invention.

Embodiments of the present invention apply the multiresolution decomposition technique in an adjustable resolution video image transmission method and in a multi-channel KVM server that supports a TV wall mode (also known as picture-in-picture mode).

The YCbCr color system is widely used to represent color images and video, as well as in image and video compression. In this color system, the Y component represents the luminance (brightness) information, and the Cb and Cr components represent the chrominance (color) information. There are many different ways to compress the three components when compressing an image or video. In some cases, there is a need to transmit compressed image or video signals to different user devices that have different communication bandwidths available to them. Some existing methods adjust the amount of chrominance information transmitted to a user device based on the available bandwidth. For a wide bandwidth user, full CbCr color information is transmitted. For a narrow bandwidth user, either the Y component only is transmitted (which results in a gray image), or a reduced amount of CbCr information is transmitted (which results in a color reduced image). In the field of KVM (keyboard video mouse) switches, color adjustment is often implemented by reducing the color number, e.g., reducing the color number of colors to 16-color or 256-color.

Figure 5A:
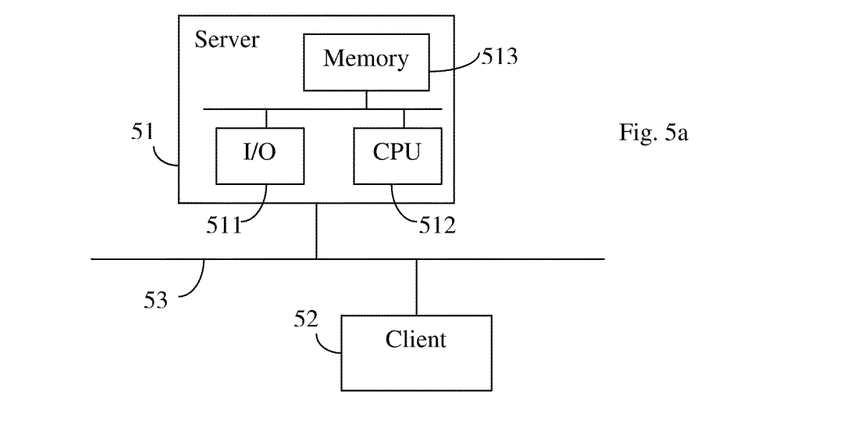
FIGS. 5a and 5b schematically illustrates typical systems in which the adjustable resolution image signal transmission process may be applicable.

Embodiments of the present invention use multiresolution decomposition to provide an image and video signal transmission method that can transmit image and video signals at a resolution that takes into consideration the bandwidth of the receiving device. A typical environment in which this signal transmission method may be applicable is a server-client environment where the server transmits video data to the client to be displayed on a display device (monitor) of the client. As schematically shown in FIG. 5a, the server 51 is connected to the client 52 by a communication link 53, which may be a cable or a network such as a local area network (LAN), wide area network (WAN), Internet, Intranet, Ethernet, etc., or a combination thereof. The bandwidth available to the client 52 may be affected by the bandwidth of the communication link 53. For example, if the server 51 and the client 52 are connected by a network, the client's bandwidth may be limited by the local link that links the client 52 to the network. Thus, different clients 52 often have different bandwidths. As shown in FIG. 5a, the server 51 includes an I/O section 511, a CPU 512 and memories 513. The image signal transmission method according to embodiments of the present invention is implemented by the CPU 512 executing software or firmware programs stored in the memories 513, or by hardware of the server 51.

Figure 5B:
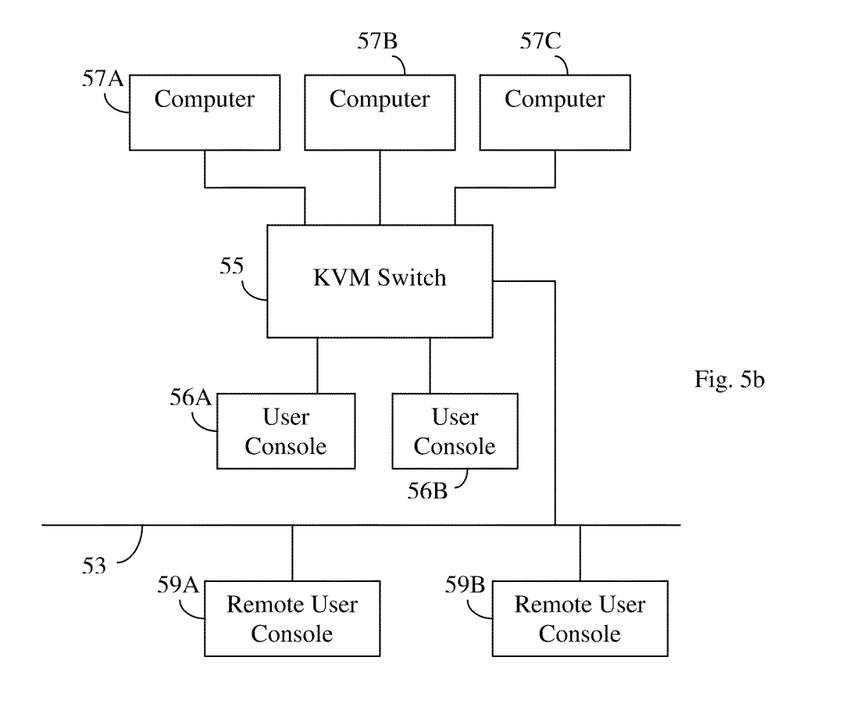

One particular example of the server-client system is a KVM (keyboard video mouse) switch system, schematically shown in FIG. 5b, where a plurality of computers 57 (57A, 57B, 57C etc.) and one or more user consoles 56 (56A, 56B, etc.) are connected to the KVM switch 55. Switching elements within the KVM switch 55 allow a user at a user console 56 to selectively communicate with and control any one of the computers 57. The KVM switch 55 transmits video signals, including video signals from the computer 57 being controlled and video signals generated by the KVM switch 55 itself, to the user console 56 for display. In some KVM systems, one or more remote user consoles 59 (59A, 59B etc.) can be connected to the KVM switch 55 via a network 53 such as a local area network (LAN), wide area network (WAN), Internet, Intranet, Ethernet, etc. Besides a keyboard, a mouse and a monitor, the remote user console 59 further includes a user-side computer loaded with software capable of establishing an IP-based connection with the KVM switch 55 through the network 53, whereby all the keyboard, mouse and video signals are transmitted in network packet form. The various image processing steps of the image signal transmission method according to embodiments of the present invention are performed either by the KVM switch 55 of by the KVM switch 55 and the computer 57 jointly.

More generally, the method applies to image signal transmission from a transmitting device to a receiving device. The descriptions below use a server and client environment as an example, where the server transmits an image or video to the client. Further, the term "image" as used in the description below should be broadly understood to include both still image and video.

Figure 3:
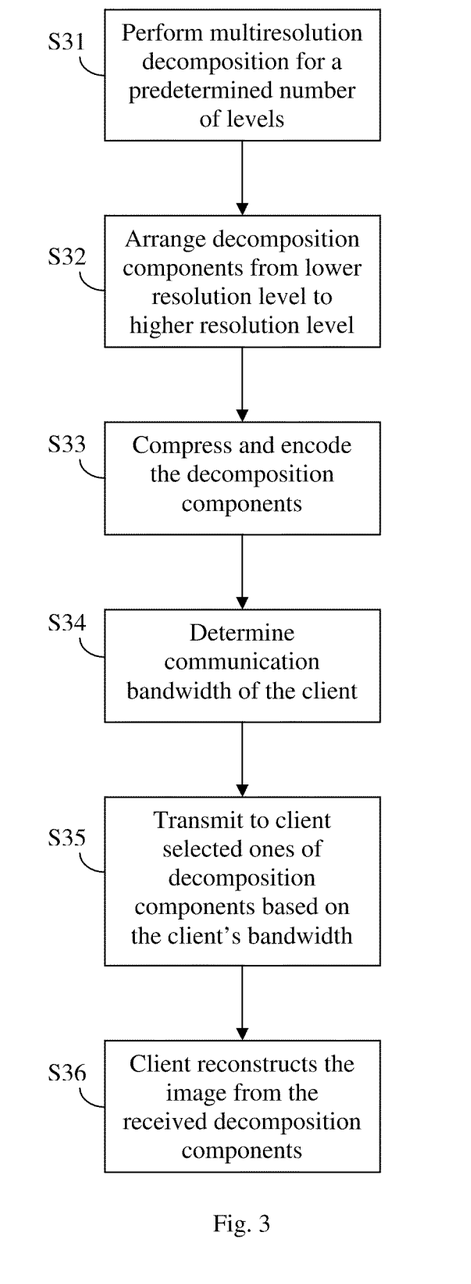
FIG. 3 illustrates an adjustable resolution image signal transmission process according to an embodiment of the present invention.
Figure 4:
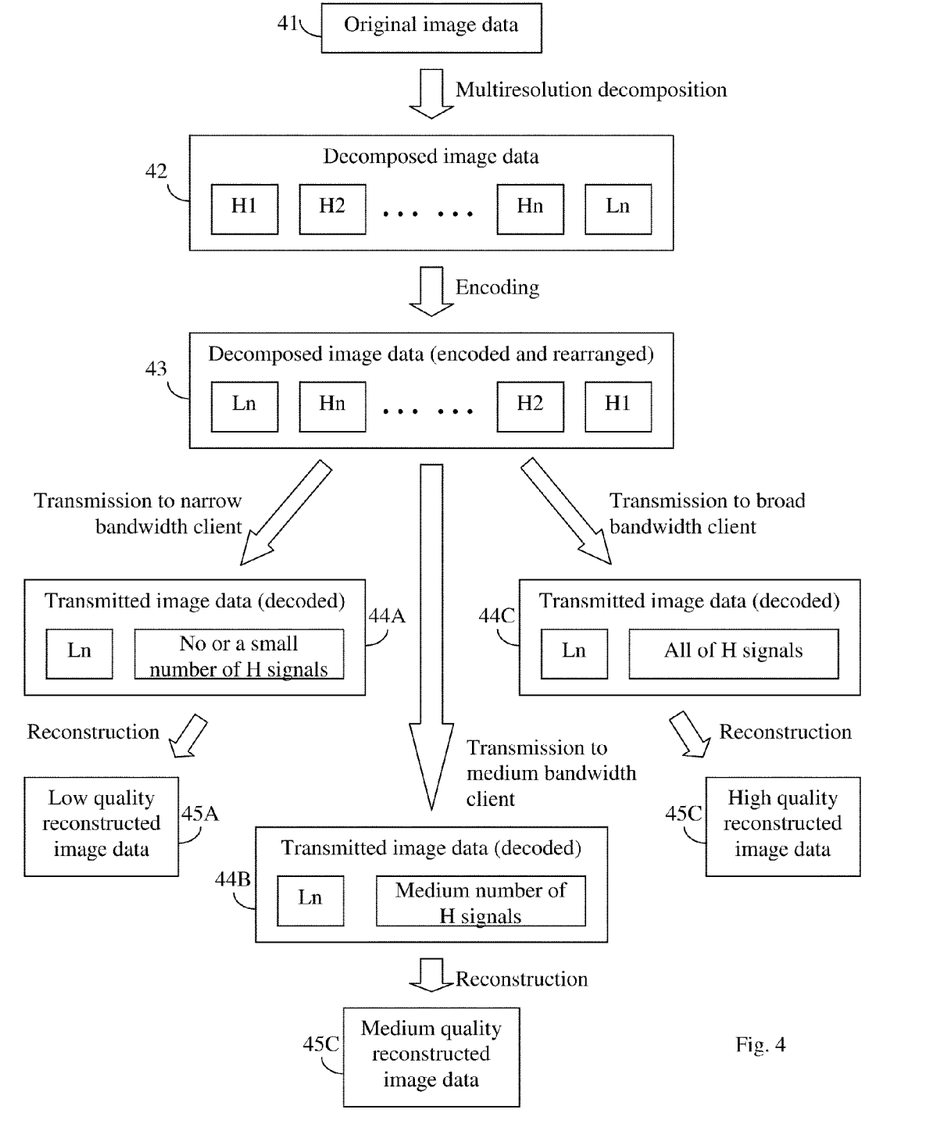
FIG. 4 schematically illustrates the various data at various stages of the process of FIG. 3.

An adjustable resolution image signal transmission process according to an embodiment of the present invention is illustrated in FIG. 3. FIG. 4 schematically illustrates the various data at various stages of the process. First, the server performs multiresolution decomposition on the image data representing the original two-dimensional image to be transmitted (step S31). As described earlier, the multiresolution decomposition process includes decomposing the original image into a smooth signal and a number of detail signals at a first resolution level, and carrying out the decomposition recursively level by level for a predetermined number of levels. At each resolution level (except for the last one), the smooth image signal is decomposed into a number of next lower resolution level signals including one smooth signal and a number of detail signals. As schematically illustrated in FIG. 4, the resulting data of the multiresolution decomposition process (the decomposed image data 42) include one smooth signal of the lowest resolution level (represented by Ln in FIG. 4) and a number of detail signals at each resolution level (in FIG. 4, H1, H2, . . . Hn represent the collection of first, second, . . . nth resolution level detail signals, respectively). These smooth and detail signals are referred to as the decomposition components in this disclosure. In one preferred embodiment, the total number of levels of decomposition is four, and the number of detail signals at each level is three, including one horizontal signal, one vertical signal, and one diagonal direction signal, such as shown in FIG. 2. It should be noted that in this example, the three detailed signals are in fact negative or inverted images (i.e., black background with white images), but for purposes of illustration, they are shown as positive images. Thus, the lowest resolution level image is $\frac{1}{16}$ the size of the original image in each side (i.e. $\frac{1}{256}$ the size of the original image in two dimensions).

Any suitable decomposition technique, including the ones described in the reference cited earlier, can be used to implement the multiresolution decomposition process. In one particular embodiment, multiresolution decomposition is implemented by a triangular-mesh based image filter bank, described in detail in Wenshun Li and Jiegu Li, "Image Compression Using Multiresolution Decomposition of Triangular Mesh Model," Acta Automatica Sinica, 1999 25 (05): 613-619.

The decomposed image data are arranged in a way so that lower resolution level decomposition components appear before higher resolution level decomposition components (step S32). For example, if the decomposed image data is stored in a file, then lower resolution level components are stored earlier in the file than higher resolution level components. Compression and coding may be optionally applied to the resulting decomposition components (step S33). For example, run-length coding and Huffman coding may be applied. In FIG. 4, item 43 schematically represents the decomposition components after they are encoded, and have been arranged as described above. This data resides on the server. Note that the arranging step S32 is optional. Also, if this step is performed, the arrangement of the decomposition components is not limited to a strict order form low resolution level to high resolution level; any arrangement that conveniently facilitates the fetching of data for transmission can be used.

As described earlier, image reconstruction is carried out from lower resolution levels to higher resolution levels. To completely construct the original image, the lowest resolution level smooth signal and all detail signals at all levels are used. To construct a relatively low resolution image, the lowest resolution level smooth signal and none or some but not all of the detail signals are used. For example, if the original image is decomposed into three levels, as in the example of FIG. 1, and only the lowest resolution level (third level) smooth signal LL3 and the lowest resolution level (third level) detail signals LH3, HL3 and HH3 are used in the reconstruction, the reconstructed image is LL2, which is a lower resolution image as compared to the original image. A lower resolution image can also be reconstructed by omitting (i.e. making them zero) some or all of the detail signals of a given level. For example, an image can be reconstructed by using LL3 and LH3 but omitting HL3 and HH3 (i.e. using some but not all detail signals of the third level), or reconstructed by using LL3 and LH2, HL2 and HH2 (i.e. omitting all detail signals of the third level but using detail signals of the second level), etc. Thus, depending on which of the detail signals are used, images of various resolutions can be reconstructed.

Typically, the amount of data in a lower resolution level (including the smooth signal and the detail signals) is about ¼ to ½ of the amount of data in the next higher resolution level. Thus, the server can select the number of levels, as well as the number of detail signals at each level, so that the amount of data transmitted to the client is suitable for the bandwidth of the client.

Referring again to FIG. 3, during image transmission to a client, the server determines the bandwidth available to the client (step S34). The client's bandwidth may be detected by the server automatically. For example, a KVM switch typically has knowledge of the bandwidth of the connection between itself and a client. Alternatively, the client may inform the server of its bandwidth. For example, if the client is connected to the server via the Internet and the local Internet access link is a bandwidth-limiting factor, the client can inform the server of its bandwidth limitation. As another alternative, the human user at the client can specify a bandwidth and the client informs the server of the specified bandwidth. Typically, the server only needs to determine the client's bandwidth once during a communication session. Thereafter, when the server has an image to transmit to the client (the image having been processed by the multiresolution decomposition step S31 and the optional arranging step S32 and compression and coding step S33), the server transmits to the client selected ones of decomposition components of the image based on the bandwidth of the client (step S35).

For example, if the client has a relatively narrow bandwidth, the server may transmit the lowest resolution level smooth signal (Ln) and either no detail signal or a small number of detail signals (see FIG. 4, item 44A). If, on the other hand, the client has a broad bandwidth, the server may transmit the lowest resolution level smooth signal (Ln) and all of the detail signals (see FIG. 4, item 44C). If the client has an intermediate bandwidth, the server may transmit the lowest resolution level smooth signal (Ln) and a medium number of detail signals (see FIG. 4, item 44B).

On the client side, the client reconstructs the image using the received decomposition components (step 36), after appropriate decoding and decompression. The resulting reconstructed image data has a resolution that is determined by the number of decomposition components used to reconstruct it (see FIG. 4, items 45A, 45B and 45C). Different clients can use the same image reconstruction method and software to reconstruct the images regardless of the number of detail signals in the image data received from the server.

Using the above-described method, when the server communicates with different clients, it transmits different numbers of decomposition components based on the bandwidth of the different clients. The server does not need to generate data representing different resolution images for transmission to different clients. Rather, the same decomposed image data can be used for clients requiring different resolutions; the server only needs to selectively transmit and different decomposition components to different clients. In other words, the server performs steps S31, S32 and S33 only once for each image, and performs steps S34 and S35 for each client (which may be performed concurrently if required). In addition, arranging and storing the decomposed image data from lower resolution level to higher resolution level (step S32) facilitates quick access of the decomposed image data for transmission to different clients because the more frequently used information (the smooth signal and lower resolution level detail signals) are stored earlier in the file. This signal transmission method has advantaged over conventional methods, such as JPEG compression technique, which require multiple, separate compressed image data to be generated for different image resolution or quality. In a conventional method, for example, a low resolution or quality compressed data, a medium resolution or quality compressed data, and a high resolution or quality compressed data would have to be separately generated and stored, and one of them is selected to be transmitted to a given client.

The multiresolution decomposition process described above can be applied to the three components of a color image, namely Y, Cb and Cr components, independently. This allows independent adjustment of the color quality of the image, which is typically determined by the amount of chrominance information (Cb and Cr) in the image data, and the resolution quality of the image (often simply referred to as "image quality"), which is typically determined by the amount of luminance information (Y) in the image data. The color quality and resolution quality can also be jointly adjusted if both the luminance and chrominance components are subject to the multiresolution decomposition process.

To accomplish color quality adjustment and control, the chrominance components (Cb and Cr) of the image are decomposed using multiresolution decomposition. Then, more or less of the detail signals of the decomposed Cb and Cr data are transmitted to the client to adjust the color quality of the reconstructed image. The luminance (Y) component of the image data can be fully transmitted to the client. It can be seen that this color quality adjustment method is different from the conventional method which adjusts color quality by reducing the number of colors.

To accomplish the image quality (resolution) adjustment and control, the luminance component (Y) is decomposed using multiresolution decomposition. More or less of the detail signals of the decomposed Y data are transmitted to the client to adjust the resolution of the reconstructed image. If the chrominance components (Cb and Cr) are also decomposed using multiresolution decomposition, then both the image quality and the color quality can be adjusted to desired degrees.

As mentioned earlier, one practical application of the adjustable resolution transmission method is in a KVM switch system such as that shown in FIG. 5b. It allows the KVM switch 55 to control and adjust the color quality and/or image quality of the video signals transmitted to different remote user consoles 59 that have different bandwidths.

Another application of the multiresolution decomposition method is for compressed video/image data storage. The low quality (or low color quality) compressed image data can be extracted directly from the high quality (or high color quality) compressed image data; only one copy of data is stored but can be used to reconstruct images of different qualities.

Another practical application of the adjustable resolution transmission is in a KVM switch system such as that shown in FIG. 5b which supports a multi-source mode (commonly referred to as a "TV wall" mode), where the desktop images of multiple computers 57A, 57B, etc. are reduced in size and displayed simultaneously on the monitor of a client 56 or 59.

Figure 6A:
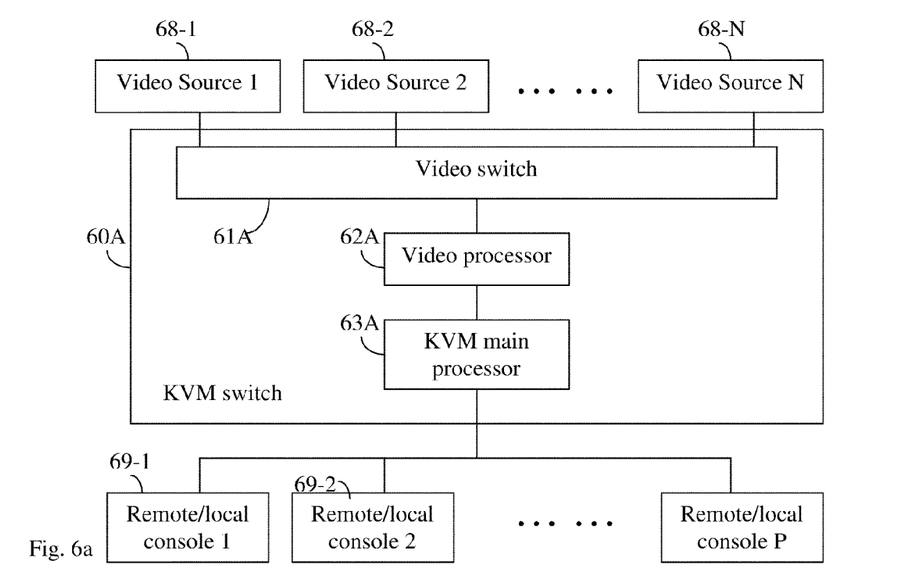
FIG. 6a illustrates a KVM switch system with a multi-source (TV wall) mode.

FIG. 6a illustrates the structures of a conventional KVM switch supporting a multi-source mode. The multiple video sources 68 (68-1, 68-2, . . . 68-N) correspond to multiple computers 57 in FIG. 5b. The multiple remote or local clients 69 (69-1, 69-2, etc.) correspond to the clients 56 and 59 in FIG. 5b. As shown in FIG. 6a, the KVM switch 60A includes a video switch 61A, a video processor 62A, and a KVM main processor 63A. The video switch 61A selectively connects the video processor 62A to one of the video sources 68. The video processor 62A samples, processes and compresses the video signal from the connected video source. The KVM main processor 63A transmits the processed video data to the client 69. The KVM main processor 63A also performs other functions of the KVM switch 60A, such as communicating with the client, controlling various other parts of the KVM switch 60A, etc.

When a client 69 is in a normal (single-source) mode, the video switch 61A is switched to one of the video sources 68 (i.e. the selected computer), and the video signal from the selected video source is processed by the video processor 62A and transmitted to the client 69. When a client 69 is in a multi-source mode, the video switch 61A is sequentially switched to multiple video sources 68, and the video processor sequentially processes the video data from the multiple video sources, including reducing the image size. The KVM main processor 63A transmits the multiple processed data from multiple video sources to the client 69. The client displays the multiple images at appropriate locations on its monitor to form a TV wall. For example, the client may display four desktop images from four computers each filling a quarter of the monitor.

Figure 6B:
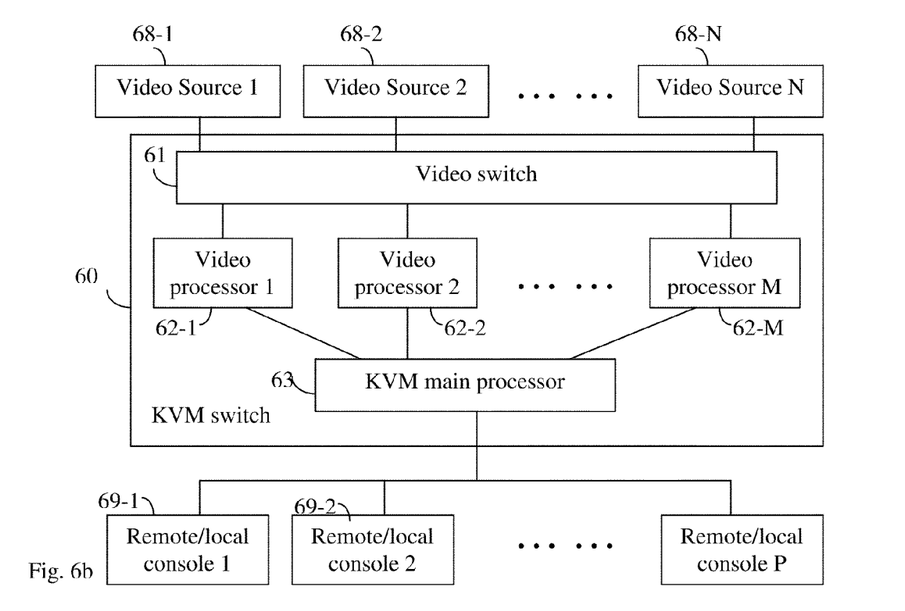
FIG. 6b illustrates a KVM switch system with a multi-source (TV wall) mode according to an embodiment of the present invention.

FIG. 6b illustrates a KVM switch system supporting a multi-source mode according to an embodiment of the present invention. The multiple video sources 68 (68-1, 68-2, ... 68-N) correspond to multiple computers 57 in FIG. 5b. The multiple remote or local clients 69 (69-1, 69-2, etc.) correspond to the clients 56 and 59 in FIG. 5b. As shown in FIG. 6b, the KVM switch 60 includes a matrix video switch 61, a plurality of video processors 62 (62-1, 62-2, ... 62-M), and a KVM main processor 63. The video switch 61 selectively connects each video processor 62 to one of the video sources 68 as described in more detail later. Each video processor 62 samples, processes and compresses the video signal from the connected video source. The KVM main processor 63 transmits the processed video data from appropriate video processors 62 to appropriate clients 69. With multiple video processors 62, the KVM switch 60 can supply multiple clients; this type of KVM switch is sometimes referred to as a multi-channel KVM switch (i.e. a KVM switch having multiple video channels).

In the structures of FIGS. 6a and 6b, each video processor 62A/62 may include an analog-to-digital converter (ADC) and a video buffer (not shown) for temporarily storing the video signal being processed. In the structure of FIG. 6b, the multiple video processors 62 may be integrated into a single video processor with multiple video processing circuits such that a plurality of video signals from different video sources are processed independently and simultaneously. That is, the single video processor is able to provide multiple video processing channels at the same time. The video switch 61A/61 may be a cross-point switch or a matrix switch selectively connects the video processor 62A/62 to one or more than one of the video sources 68.

The KVM switch 60A/60 may further include a network interface circuit (not shown) so that the KVM main processor 63A/63 can transmit the processed video data to the remote client 69 via the network 53 (refer to FIG. 5b; the network is not shown in FIGS. 6a and 6b). Further, although in FIGS. 6a and 6b the KVM main processor 63A/63 is shown as being connected between the video processors 62A/62 and the network, the actual hardware implementation may vary. For example, the video processors 62A/62, the KVM main processor 63A/63 and the network interface circuit may be connected to each other by a local bus. Alternatively, additional circuits may perform the function of transmitting the processed data from the video processors to the network. More generally, the collection of hardware circuits that perform the function of transmitting processed video data (including multiresolution decomposition components) to the client may be referred to as a transmission circuit. In the description below, the transmission circuit is exemplified by the KVM main processor 62A/62.

The KVM main processor 63 also performs other functions of the KVM switch 60, such as communicating with the clients, controlling various other parts of the KVM switch 60A, etc. In particular, the KVM main processor receives connection requests from the clients indicating which video sources the client wishes to connect to and the connection mode (normal or multi-source).

There have been conventional KVM switch systems generally having a same overall structure as that shown in FIG. 6b. However, in such a conventional system, each video processor supplies one client; when a video processor supplies a client in a multi-source mode, the video processor must sequentially connect to multiple video sources and process video data from them sequentially. Further, each time the video processor is connected to a different video source 69, it must perform a video auto-sync process to adjust the ADC pll, phase, and video offset. Thus, sequential switching to multiple video sources is time-consuming and causes delay.

An embodiment of the present invention uses the multiresolution decomposition method in a multi-source mode to simplify video processing and reduce the number of times a video processor is sequentially switched to multiple video sources. This embodiment is described with reference to FIGS. 6b, 7 and 8. The description below uses an exemplary scenario where a first and a second client are in a normal (single-source) mode to display imaged from a first and a second video source, respectively, and a third client is in a multi-source mode to display images from first, second, third and fourth video sources simultaneously. Other examples can be similarly understood.

Figure 7:
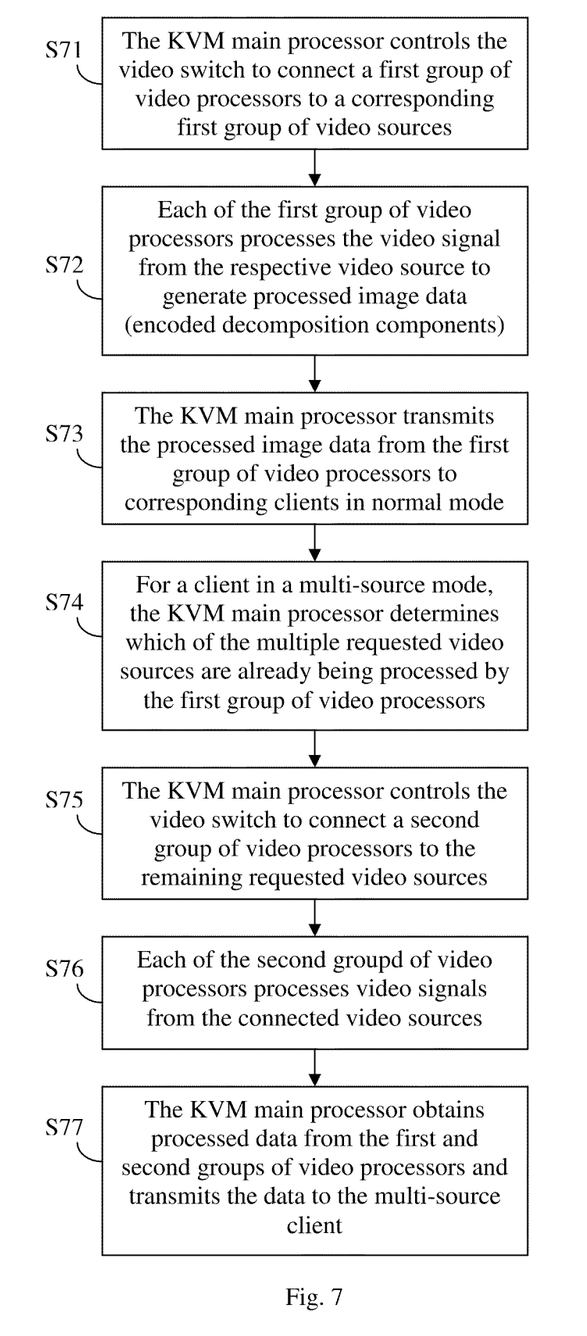
FIG. 7 illustrates an adjustable resolution image signal transmission process according to the embodiment of FIG. 6b.

First, for each video source 68 that is supplied to a client 69 in a normal mode, the KVM main processor 63 assigns a video processor 62 to the video source. The KVM main processor 63 controls the video switch 61 to connect these video processors 62 to the corresponding video sources 68 (step S71). For convenience, these video processors are collectively referred to as the first group of video processors and the video sources they process are collectively referred to as the first group of video sources. In the exemplary scenario, the KVM main processor controls the video switch to connect the first and second video processors to the first and second video sources, respectively. Each of the first group of video processors processes the video signal from its respective video source (step S72). The processing includes video signal sampling, multiresolution decomposition (similar to steps S31 and S32 in FIG. 3), compression and coding (similar to step S33 in FIG. 3), etc., to generate a predetermined number of encoded decomposition components.

Figure 8:
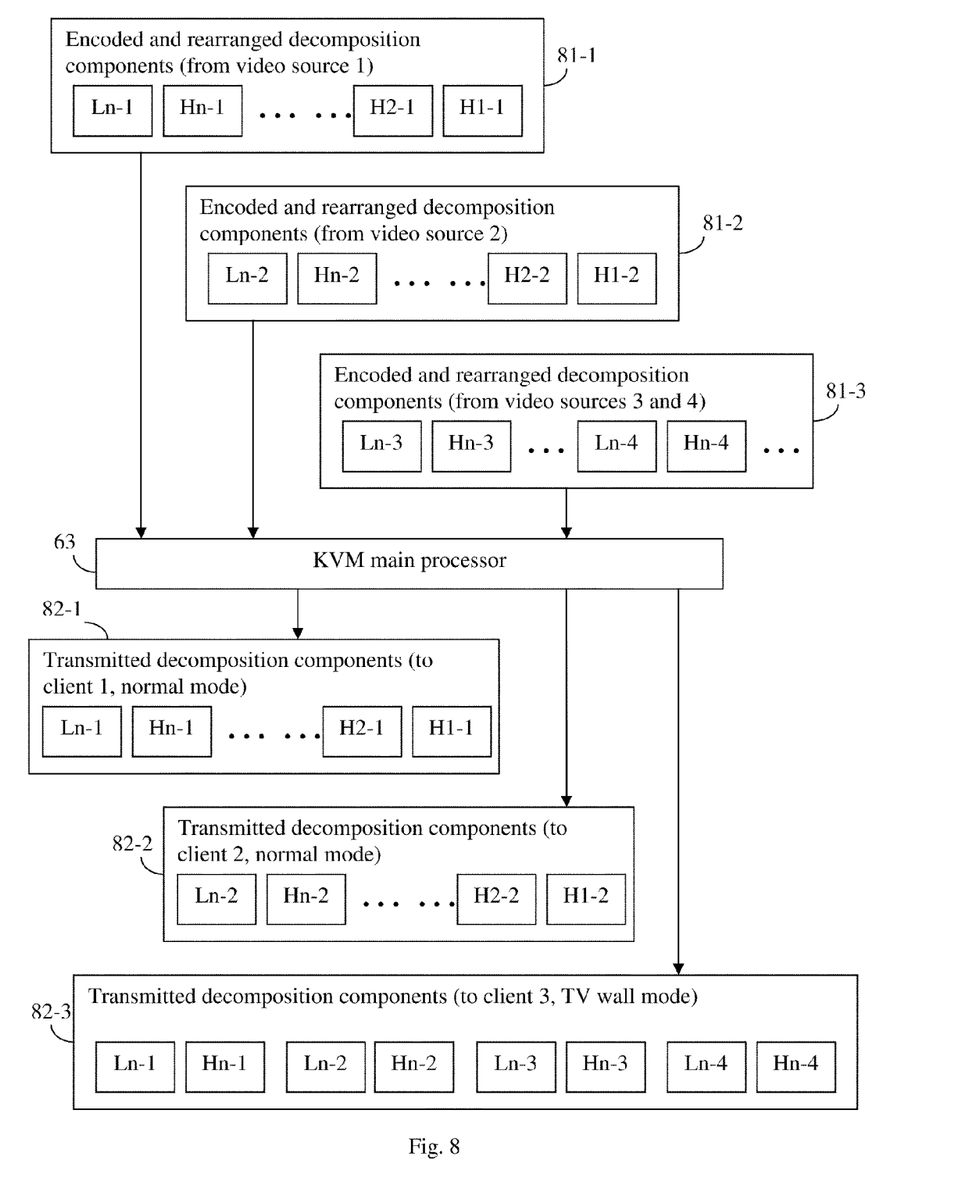
FIG. 8 schematically illustrates the various data at various stages of the process of FIG. 7.

In FIG. 8, the data 81-1 schematically represents encoded decomposition components generated by the first video processor from the first video source, which includes one smooth signal of the lowest resolution level (Ln-1) and a number of detail signals at each resolution level (Hn-1, ... H2-1, H1-1). This data 81-1 is similar to the data 43 shown in FIG. 4. Similarly, in FIG. 8, the data 81-2 schematically represents encoded decomposition components generated by the second video processor from the second video source.

The KVM main processor 63 transmits the video data (in the form of encoded decomposition components) generated by the first group of video processor to corresponding clients which are in the normal mode (step S73). The KVM main processor may transmit different number of decomposition components to different clients depending on the bandwidth of that client in a manner described earlier (see FIGS. 3 and 4). In FIG. 8, the data 82-1 schematically represents the compressed image data transmitted to the first client, which includes decomposition components Ln-1, Hn-1, . . . H1-1. Similarly, the data 82-2 schematically represents the compressed image data transmitted to the second client. In this example, all decomposition components at high resolution levels are transmitted to the first and second clients, so that high resolution images can be formed by these clients. Of course, the KVM main processor may transmit fewer than all of the H signals to the first or second client. For example, the number of the H signals transmitted may depend on a resolution either requested by the client or determined by the KVM switch.

To supply a client which is in the multi-source mode, the KVM main processor 63 will need to transmit processed image data from multiple video sources requested by the multi-source mode (e.g. the first to fourth video sources in the exemplary scenario), each at a lower resolution (e.g. one half of the resolution in the normal mode in the exemplary scenario). However, some of the requested video sources are already being processed by the first group of video processors, so the processed data can be used as a part of the multi-source data. Thus, the KVM main processor determines which of the multiple requested video sources are already being processed by the first group of video processors (i.e. which ones are in the first group of video sources) (step S74).

The KVM main processor then assigns one or more video processors (collectively, a second group of video processors) to process the remaining requested video sources that are not being processed by the first group of video processors. If enough video processors are available for use, the KVM main processor may assign one video processor to each remaining requested video source. In such a case, each video processor will only process one video source, and none of the video processors will need to be sequentially switched to two or more video sources. Alternatively, the KVM switch may assign the second group of video processors to the remaining video sources in a way that some video processors in the second group still need to be switched sequentially to two or more video sources, but the number of switching is reduced as compared to the conventional method. The KVM main processor controls the video switch to connect each of the second group of video processors to the assigned video sources (step S75).

Each of the second group of video processors processes the video signals from the connected video source(s) using multiresolution decomposition to generate encoded decomposition components (step S76). The processing of each video source is the same as in the first group of video processors. Here, since the video data is for the purpose of supplying a multi-source client, the number of high resolution components generated by the multiresolution decomposition method may be few than in a normal mode.

In the exemplary scenario shown in FIG. 8, the images from the first and second video sources are already being processed by the first and second video processors. The KVM main processor assigns the third video processor to process the third and fourth video sources. Switching between the third and fourth video sources is necessary in this case. The decomposition components generated by the third video processor, shown as data 81-3 in FIG. 8, include components Ln-3, Hn-3, . . . generated from the third video source and components Ln-4, Hn-4, . . . generated from the fourth video source. The number of decomposition components generated for the third and fourth video sources may be fewer than in the normal mode.

Next, the KVM main processor 63 obtains processed video data for the multiple video sources requested by the multi-source client and transmits these data to the multi-source client (step S77). Some of the processed video data are obtained from video processors in the first group, and the rest are obtained from the second group of video processors. Since these processed video data are for the multi-source mode which requires a lower resolution for each desktop image, fewer decomposition components from each video source are transmitted.

In the exemplary scenario, the data transmitted to the third client in the multi-source mode, as schematically shown as data 82-3 in FIG. 8, includes decomposition components Ln-1, Hn-1, Ln-2, Hn-2, Ln-3, Hn-3, Ln-3, Hn-4, i.e., the smooth signal for the lowest resolution level (Ln) and one detail signal at the lowest resolution level (Hn) for each of the first to fourth video sources. The decomposition components Ln-1, Hn-1, Ln-2, Hn-2 are obtained from the first and second video processors (i.e. from data 81-1 and 81-2), and the decomposition components Ln-3, Hn-3, Ln-3, Hn-4 are obtained from the third video processor (i.e. from data 81-3).

In the above-described manner, the KVM main processor 63 obtains multiresolution decomposition components from multiple video processors to form multi-source data which include data from multiple requested video sources, and transmits the multi-source data to the multi-source client. Because the KVM main processor 63 has knowledge of which video processors are currently processing signals from which video sources for normal mode clients, it can efficiently utilize the already-generated data to generate the multi-source data.

In the embodiment of FIGS. 6b, 7 and 8, the KVM switch is more generally a server that supplies video signals from a plurality of video sources to a plurality of clients.

The method of generating multi-source data according to this embodiment has many advantages. First, the multiresolution decomposition components can be re-used to supply a client in normal mode and a client in multi-source mode. This avoids duplicative video signal processing, and does not increase data storage. In the conventional method, a video processor supplying a client in multi-source mode will process video signals from all requested video sources even if some of these video sources are also being processed by other video processor for supplying another clients. The conventional method cannot re-use video data already processed as a part of multi-source data because the video data is typically compressed using methods such as MPEG, JPEG, etc. Such compression methods do not allow a part of a compressed high-resolution image data to be readily separated and used as a low-resolution image data. Using embodiments of the present invention, when two or more clients request to display video images from a same video source, the video source only needs to be switched to one video processor and processed by that one video processor. The KVM main processor will use the compressed data generated by that one video processor to supply the two or more clients. The two or more clients may be all in the normal (single-source) mode, or one or more clients may be in the normal mode and one or more clients may be in the multi-source mode.

Second, using the method of the present embodiment, a video processor does not need to be sequentially connected to all of the requested video sources of the multi-source mode. The number of video source switching can be significantly reduced or eliminated. This reduces the processing time associated with switching video sources.

The system and method of FIGS. 3, 4 and 5b and the system and method of FIGS. 6b, 7, and 8 share some common features. One common feature is that the server can detect different requirements of different clients, and selectively transmits different encoded multiresolution decomposition components to the different clients based on their requirements. In the system and method of FIGS. 3, 4 and 5b, different clients require different resolution levels for the image data due to their bandwidth limitations. In the system and method of FIGS. 6b, 7 and 8, different clients require different modes, such as a normal mode involving one video source only and a multi-source mode involving multiple video sources. In both methods, the server meets the different client requirements by transmitting the appropriate multiresolution decomposition components to the clients.

Another common feature shared by the system and method of FIGS. 3, 4 and 5b and the system and method of FIGS. 6b, 7, and 8 is the re-use of decomposition components generated by the server. In the system and method of FIGS. 3, 4 and 5b, different subsets of the decomposition component generated within the KVM switch 55 are transmitted to different clients to satisfy their resolution requirements. In the system and method of FIGS. 6b, 7, and 8, for some video processors (e.g. the first and second video processors in the exemplary scenario), some of the decomposition components they generate are transmitted to two or more clients (e.g. one normal client and one multi-source client).

It will be apparent to those skilled in the art that various modification and variations can be made in the adjustable resolution image signal transmission method and apparatus of the present invention without departing from the spirit or scope of the invention. Thus, it is intended that the present invention cover modifications and variations that come within the scope of the appended claims and their equivalents.

What is claimed is:

1. A server for supplying video signals from a plurality of video sources to a plurality of clients, comprising:
   a plurality of video processing circuits;
   a video switch coupled to the plurality of video sources and the plurality of video processing circuits, the video switch being operable to connect each video processing circuit to one or more video sources;
   wherein each video processing circuit is operable to process video signals from the connected video sources using a multiresolution decomposition method to generate a plurality of decomposition components for each connected video source, including a smooth signal component and one or more detail signal components at one or more resolution levels, and
   a transmission circuit for selectively transmitting decomposition components generated by the video processing circuits to the clients based on requirements of the clients, wherein at least some of the time, the transmission circuit transmits decomposition components generated by two or more video processing circuits connected to two or more video sources to one of the clients for displaying images from the two or more video sources on the client simultaneously,
   wherein for the at least one video processing circuit, a first number of decomposition components it generates are transmitted to a first client operating in a single-source mode, a second number of decomposition components it generates are transmitted to a second client operating in a multi-source mode where images from multiple video sources are simultaneously displayed on the second client, the second number being lower than the first number.

2. The server of claim 1, wherein at least some of the time, the transmission circuit transmits some of the decomposition components generated by one of the video processing circuits to two or more clients simultaneously.

3. The server of claim 1, wherein the video switch connects each one of a first group of video processing circuits to a corresponding one of a first group of video sources,
   wherein each one of the first group of video processing circuits processes the video signal from the corresponding video source using the multiresolution decomposition method to generate a plurality of decomposition components for the corresponding video source,
   wherein the transmission circuit transmits at least some of the decomposition components generated by each one of the first group of video processing circuits to a corresponding one of a first group of clients operating in a single-source mode,
   wherein the video switch connects a second group of video processing circuits to a second group of video sources,
   wherein each one of the second group of video processing circuits processes the video signal from the connected video sources using the multiresolution decomposition method to generate a plurality of decomposition components for each video source it is connected to, and
   wherein the transmission circuit transmits at least some decomposition components generated by at least one of the first group of video processing circuits and at least some decomposition components generated by each one of the second group of video processing circuits to a second client operating in a multi-source mode, whereby the second client receives decomposition components generated from a plurality of video sources.

4. The server of claim 3, wherein each of the second group of video processing circuits is connected to a corresponding one of the second group of video sources.

5. The server of claim 3, wherein at least one of the second group of video processing circuits is connected to two or more of the second group of video sources sequentially.

6. The server of claim 1, wherein the multiresolution decomposition method comprises, for each video source:
   (a) decomposing video signal from the video source into a first resolution level smooth signal and a predetermined number of first resolution level detail signals;
   (b) decomposing the first resolution level smooth signal into a second resolution level smooth signal and the predetermined number of second resolution level detail signals; and
   (c) repeating the decomposition step (b) until a smooth signal and the predetermined number of detail signals at a predetermined resolution level are generated.

7. The server of claim 6, wherein the multiresolution decomposition method further comprises compressing and coding the decomposition components.

8. The server of claim 7, wherein the multiresolution decomposition method further comprises arranging the plurality of decomposition components such that the smooth signal and lower resolution level detail signal components appear before higher resolution level detail signal components.

9. In a server system comprising a server, a plurality of video sources connected to the server, and a plurality of clients connected to the server, the server comprising a plurality of video processing circuits, a video switch connected to the plurality of video sources and the plurality of video processing circuits, and a transmission circuit coupled to the plurality of clients, a method executed by the server for supplying video signals from the plurality of video sources to the plurality of clients, comprising:

(a) the video switch connecting each of at least some of the video processing circuits to one or more video sources;

(b) each of the at least some of the video processing circuits processing video signals from the connected video sources using a multiresolution decomposition method to generate a plurality of decomposition components for each connected video source, including a smooth signal component and one or more detail signal components at one or more resolution levels; and (c) the transmission circuit transmitting at least some decomposition components generated by at least some video processing circuits to at least some clients based on requirements of the clients, wherein at least some of the time, the transmission circuit transmits decomposition components generated by two or more video processing circuits connected to two or more video sources to one of the clients for displaying images from the two or more video sources on the client simultaneously, wherein for the at least one video processing circuit, a first number of decomposition components it generates are transmitted to a first client operating in a single-source mode, a second number of decomposition components it generates are transmitted to a second client operating in a multi-source mode where images from multiple video sources are simultaneously displayed on the second client, the second number being lower than the first number.

10. The method of claim 9, wherein at least some of the time, the transmission circuit transmits some of the decomposition components generated by one of the video processing circuits to two or more clients.

11. The method of claim 9,
wherein step (a) includes:
(a1) connecting each one of a first group of video processing circuits to a corresponding one of a first group of video sources;
(a2) connecting a second group of video processing circuits to a second group of video sources;
wherein step (c) includes:
(c1) transmitting at least some of the decomposition components generated by each one of the first group of video processing circuits to a corresponding one of a first group of clients operating in a single-source mode;
(c2) transmitting at least some decomposition components generated by at least one of the first group of video processing circuits and at least some decomposition components generated by each one of the second group of video processing circuits to a second client operating in a multi-source mode, whereby the second client receives decomposition components generated from a plurality of video sources.

12. The method of claim 11, wherein each of the second group of video processing circuits is connected to a corresponding one of the second group of video sources.

13. The method of claim 11, wherein at least one of the second group of video processing circuits is connected to two or more of the second group of video sources sequentially.

14. The method of claim 9, wherein the multiresolution decomposition method comprises, for each video source:

(b1) decomposing video signals from the video source into a first resolution level smooth signal and a predetermined number of first resolution level detail signals;

(b2) decomposing the first resolution level smooth signal into a second resolution level smooth signal and the predetermined number of second resolution level detail signals; and (b3) repeating the decomposition step (b) until a smooth signal and the predetermined number of detail signals at a predetermined resolution level are generated.

15. The method of claim 14, wherein the multiresolution decomposition method further comprises compressing and coding the decomposition components.

16. The method of claim 15, wherein the multiresolution decomposition method further comprises arranging the plurality of decomposition components such that the smooth signal and lower resolution level detail signal components appear before higher resolution level detail signal components.

17. A method for transmitting image signals by a server to a plurality of clients, comprising:

(a) processing video signals from a plurality of video sources by a plurality of video processing circuits using multiresolution decomposition to generate a plurality of decomposition components, including, for the video signal from each video source, a smooth signal component and one or more detail signal components at one or more resolution levels;

(b) determining a transmission requirement for each client, including a resolution and a mode indicating a number of video sources from which images are received and simultaneously displayed, including a single-source mode and a multi-source mode; and (c) transmitting to each client a plurality of the decomposition components based on the transmission requirement, including transmitting a first number of decomposition components generated by a first video processing circuit to a first client operating in the single mode and transmitting a second number of decomposition components generated by the first video processing circuit to a second client operating in the multi-source mode where images from multiple video sources are simultaneously displayed on the second client, the second number being lower than the first number.

18. The method of claim 17, wherein the plurality of decomposition components includes a plurality of sets of decomposition components, each set of decomposition components being generated from one video source and including a smooth signal component and one or more detail signal components.

* * * * *